United States Patent [19]

Shotwell

[11] 3,916,478

[45] Nov. 4, 1975

[54] VIBRATION ISOLATING GRIP FOR PNEUMATIC HAND TOOLS

[75] Inventor: Daniel Bronson Shotwell, Washington, Ill.

[73] Assignee: Caterpillar Tractor Co., Peoria, Ill.

[22] Filed: May 15, 1974

[21] Appl. No.: 470,203

[52] U.S. Cl. ............. 16/116 R; 279/1 Q; 242/68.2; 279/4
[51] Int. Cl.² ..................... A47J 45/08; B25G 1/12
[58] Field of Search .......... 16/110 R, 114 R, 116 R; 173/171; 279/1 Q, 2, 4; 242/68.2, 46.2, 72 B

[56] References Cited
UNITED STATES PATENTS

| 2,697,563 | 12/1954 | Miller | 242/68.2 |
|---|---|---|---|
| 3,677,559 | 7/1972 | Andre et al. | 279/1 Q |
| 3,679,219 | 7/1972 | Cameron | 279/1 Q |

*Primary Examiner*—George H. Krizmanich
*Attorney, Agent, or Firm*—Ralph E. Walters

[57] ABSTRACT

A vibration isolating and heat insulating hand grip for use with hand held pneumatic chisels and similar pneumatic hand tools. A manually grippable rigid sleeve is slidably mounted on a housing member which surrounds a rigid, tubular shell to define an annular cavity. Internally secured to the shell is a compliant, non-porous sleeve, the shell and the sleeve defining an inflatable annular chamber. A bladder confined between the housing and the shell communicates with the inflatable annular chamber so that movement of fluid back and forth between the bladder and the chamber causes the compliant sleeve to grip or release a tool shank. Such movement of fluid is caused by an annulus internally mounted on the rigid, slidable sleeve in alignment with the bladder.

25 Claims, 3 Drawing Figures

U.S. Patent    Nov. 4, 1975    3,916,478
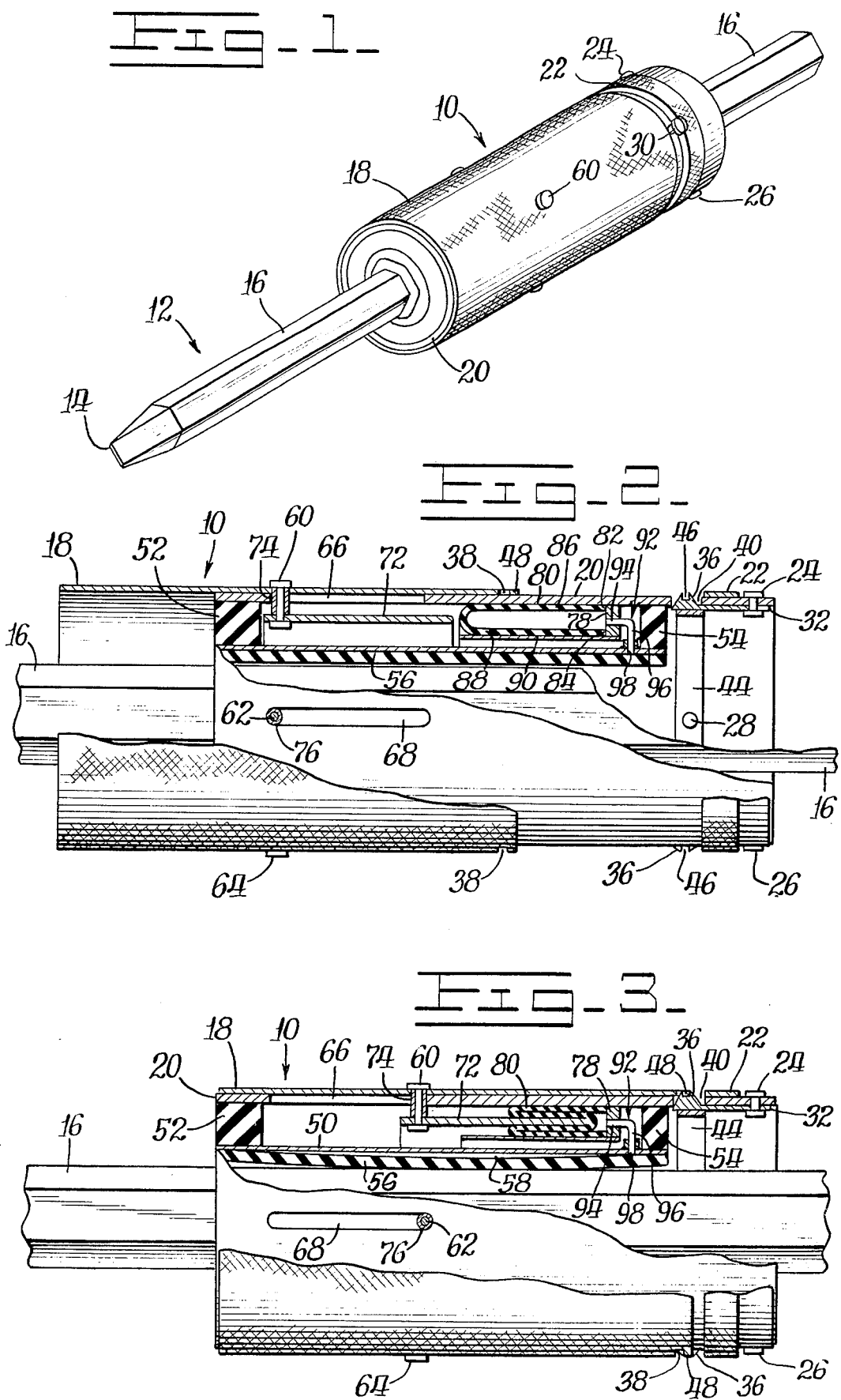

VIBRATION ISOLATING GRIP FOR PNEUMATIC HAND TOOLS

BACKGROUND OF THE INVENTION

The operation of pneumatic chisels, small air hammers, and similar hand held impact tools is often difficult and cumbersome due to the absence of adequate holding grips. Usually a single hand grip on the tool body is provided to support the tool while positioning and guidance of the tool bit are accomplished by whatever means may be available to the operator. For example, pneumatic chisels are widely used in the metal casting industry to remove flash from rough castings. The most convenient place to grip such chisels for effective guidance of the chisel point is on the chisel shank. However, this practice may be physically damaging to the operator's hand. The high frequency vibration of the tool shank may impair blood circulation in the hand, causing possible damage to capillary vessels. This condition is commonly referred to as "white hand" or "chippers syndrome". In addition, such tool shanks become hot and, therefore, pose the additional hazard of burning the operator's hand. Heavy insulating gloves are used to avoid this danger, but the bulk of such gloves decreases the holdability and controlability of the tool without materially protecting the operator's hand against the vibration of the tool shank.

SUMMARY OF THE INVENTION

The principal object of the present invention is to provide a simple, effective, vibration isolating and heat insulating hand grip for use with manually manipulated, power driven impact tools such as hydraulic chisels.

Another object of the invention is to provide a device which is readily attached to or detached from the shank of an impact tool such as a chisel.

Yet another object of the invention is to provide such a device which is attached to or detached from the shank of an impact tool by means of a simple, manual manipulation that can be performed by a man wearing work gloves.

THE DRAWINGS

FIG. 1 is an isometric view of a vibration isolating and heat insulating hand grip mounted on the shank of a chipping chisel;

FIG. 2 is a longitudinal side elevational view of the grip, partly in section, illustrating the disengaged position of the grip; and FIG. 3 is a view similar to FIG. 2 with the device in chisel shank gripping position.

DETAILED DESCRIPTION OF THE INVENTION

As shown in FIG. 1, a vibration isolating and heat insulating hand grip embodying the principles of the present invention is generally indicated by the reference numeral 10. The grip engages a chisel, indicated generally at 12, which has a tip 14 and a hexagonal shank 16 which mounts in the chuck of a pneumatic hand tool, not shown.

The hand grip 10 includes a knurled rigid sleeve 18 circumscribing a circumferential housing wall 20. A similarly knurled disengagement ring 22 also circumscribes the housing wall 20, and is limited in its axial translation with respect to the housing wall by a first pair of rivets 24 and 26 positioned near an end of the housing and a second pair of rivets 28 and 30 positioned inwardly of the first pair. Notches provided in the ring at the respective rivet locations serve to axially guide and rotationally fix the ring 22 with respect to the housing.

The rivets 24 and 26 also secure to the housing wall 20 a pair of locking detents, such as the detent 32, which have outwardly extending nibs 36 that are biased radially outwardly through openings such as the opening 40 in the housing wall 20 by a spring band 44 which is mounted within the housing wall 20 by the rivets 28 and 30. When the sleeve 18 is in the position of FIG. 3, the nibs 36 project into openings 38 in the sleeve 18, and notches 46 in the nibs engage sleeve portions 48.

A tubular shell 50 is concentrically positioned within the housing wall 20 by annular housing end walls 52 and 54 disposed at opposite ends of the shell 50. The end walls 52 and 54 are formed of natural rubber or a similar vibration damping and heat insulating material, and they are secured to the housing wall 20 and the shell 50 by a mastic or glue, such as epoxy. A compliant non-porous tool engaging sleeve 56, having a cylindrical outer surface and a hexagonally formed inner wall is secured to the inner housing member, at its distal ends only, by epoxy, or other sealant, to provide an inflatable annular chamber 58 which is best shown in FIG. 3.

The knurled sleeve 18 is slideably attached to the housing wall 20 by a plurality of rivets, of which at least portions of three are shown and identified by the reference numbers 60, 62 and 64, which respectively extend through slots such as the slots 66 and 68 in the housing wall 20 to axially guide and rotationally fix the sleeve with respect to the housing wall 20. An annulus 72 disposed radially inwardly of the sleeve and outer housing member is attached to the sleeve 18 by the aforementioned rivets 60, 62 and 64. Spacers, such as the spacers 74 and 76, are disposed about the rivets to concentrically position the annulus 72 within the housing wall.

An inwardly extending circumferential flange 78 is mounted on the circumferential housing wall 20 near the housing end wall 54, and an annular bladder 80 which is U-shaped in cross-section has its edges 82 and 84 bonded to the flange 78. The side walls 86 and 88 of the bladder are radially confined between the housing wall 20 and a confining tube 90 which is mounted on the inner periphery of the circumferential flange 78.

A passage, indicated generally at 92, connects the interior of the bladder with the annular chamber 58, and consists of a hole 94 in the circumferential flange 78, and a flexible pipe 96 which connects the hole 94 with a hole 98 in the shell 50.

The chisel 12 is mounted in the chuck of a pneumatic tool, not shown, and the hand grip 10, in the disengaged mode as shown in FIG. 2, is inserted over the tip portion 14 of the chisel. In the disengaged mode, the inflatable chamber 58 is not pressurized thereby permitting the compliant tool engaging sleeve 56 to loosely conform to the shell 50. In this state, the compliant sleeve 56 readily passes over the chisel shank 16.

The operator positions the grip at the most convenient location on the shank and then slides the knurled rigid sleeve 18 back along the grip to the closed position shown in FIG. 3 to secure the grip 10 to the shank 16. During this movement, the annulus 72 attached to the sleeve 18 axially deforms the bladder 80 which is confined against radial deformation by the housing wall 20 and the confining tube 90. Fluid, which may be air;

other gaseous medium, or a liquid, is thereby moved from the bladder 80 through the passage 92 into the inflatable annular chamber 58; and this causes the compliant tool engaging sleeve 56 to expand into firm gripping engagement with the chisel shank 16.

Pressure in the inflatable chamber 58 is maintained by retaining the knurled sleeve 18 in the gripping position of FIG. 3. As the sleeve approaches the limit of its travel toward gripping position it depresses the locking detents 32 until the nibs 36 can snap out into the holes 38 where the notches 46 engage the sleeve portions 48 to retain the rigid sleeve in gripping position.

The rigid knurled sleeve 18 is released from its gripping position by sliding the disengagement ring 22 toward it to depress the detents 32 for disengagement from the sleeve 18. The rigid sleeve is then free to be moved to the inactive position so that fluid may return to the bladder 80 from the inflatable chamber 58 and release the compliant tool engaging sleeve 56 from the chisel shank 16.

When the grip is in use on the chisel, vibrations from the chisel shank are considerably attenuated by the compliant tool engaging sleeve 56 and are substantially entirely absorbed by the housing end walls 52 and 54 to effectively isolate the housing wall 20 and rigid sleeve 18 from such vibrations. The wall 20 and rigid sleeve 18 are similarly insulated from heat that develops in the chisel 12.

The foregoing detailed description is given for clearness of understanding only and no unnecessary limitations should be understood therefrom as modifications will be obvious to those skilled in the art.

I claim:

1. A vibration isolating and heat insulating hand grip for a power driven, manually manipulated impact tool which has a shank that mounts in a chuck, said grip comprising, in combination:
   a rigid, tubular shell of non-porous material which is adapted to surround a tool shank and is open at both ends;
   a compliant, non-porous sleeve within said shell, said sleeve being open at both ends and being large enough that a tool shank extends loosely therethrough, said sleeve having only its end portions bonded to the end portions of the shell, and said shell and sleeve defining an inflatable annular chamber;
   a cylindrical vibration damping and heat insulating housing surrounding the shell, the dimensions of said housing being such that it may be readily gripped by a human hand;
   and means operatively associated with said shell for inflating said chamber so the compliant sleeve firmly grips the tool shank, and for deflating said chamber to release said compliant sleeve from the tool shank.

2. The combination of claim 1 in which the means for inflating and deflating the annular chamber comprises a deformable bladder in the housing, a passage connecting the bladder with the annular chamber, and manually operable means for manipulating the bladder to move fluid back and forth between the bladder and the chamber.

3. The combination of claim 2 in which the housing includes a longitudinal guideway, the bladder is annular and is radially confined in the housing, and in which the manually operable means comprises a rigid sleeve engaged with the guideway and longitudinally slidable on the housing, and means carried by the rigid sleeve within the housing which deforms the bladder when said rigid sleeve is slid in one direction.

4. The combination of claim 3 in which the guideway is formed by a plurality of parallel slots in the housing, members on the rigid sleeve extend through the slots into the housing, and the means carried by the rigid sleeve comprises a rigid annulus mounted on said members in longitudinal alignment with the bladder.

5. The combination of claim 4 in which the rigid sleeve partially covers the housing when the chamber is not inflated, and said rigid sleeve completely covers the housing when the bladder is deformed to inflate the chamber.

6. The combination of claim 5 which includes resilient detent means engageable with an end portion of the rigid sleeve to releasably retain said rigid sleeve in position covering the housing.

7. The combination of claim 3 in which there is an inwardly extending circumferential flange adjacent one end of the housing, there being a hole in said flange, the bladder is generally U-shaped in cross-section and has its edges sealed to the flange, and the passage includes the hole in the flange and a pipe connected to said hole and to a hole in the adjacent end portion of the shell.

8. The combination of claim 7 which includes a bladder confining tube mounted on the inner periphery of the circumferential flange, and in which the bladder has a side against said tube and a side against the housing.

9. The combination of claim 1 in which the housing comprises annular end walls of vibration damping and heat insulating material mounted on the ends of the shell, and a rigid circumferential wall embracing said end walls.

10. The combination of claim 1 in which the means for inflating and deflating the chamber includes a bladder which communicates with the chamber, means radially confining the bladder, and manually operable means which is longitudinally movable to deform the bladder.

11. The combination of claim 10 in which the manually operable means includes a rigid sleeve surrounding the shell and the bladder, and means supporting said sleeve on the shell for longitudinal sliding movement.

12. The combination of claim 1 in which the grip is adapted to be mounted on a hexagonal tool shank, and the compliant sleeve has an outer surface which is cylindrical and an inner surface which is hexagonal.

13. A vibration isolating and heat insulating hand grip for a power driven, manually manipulated impact tool which has a shank that mounts in a chuck, said grip comprising, in combination:
   a rigid, tubular shell of non-porous material which is adapted to surround a tool shank, the length of said shell being sufficient to form a hand grip;
   a compliant, non-porous sleeve within said shell, said sleeve having only its end portions bonded to the end portions of the shell, said shell and sleeve defining an inflatable annular chamber;
   a housing that includes annular end walls mounted on the ends of the shell and a circumferential wall embracing said end walls, said circumferential wall having a plurality of longitudinal slots adjacent one of its ends;

an inwardly extending circumferential flange on said circumferential wall adjacent the other of its ends, there being a hole in said flange;

a passage which includes said hole in the flange and a pipe connected to said hole and to a hole in the shell;

an annular bladder which is U-shaped in cross-section and has its edges sealed to the circumferential flange so the interior of the bladder communicates with the inflatable chamber through said passage, said bladder being radially confined in the housing;

a rigid sleeve surrounding the housing and longitudinally slideable thereon between an inactive position partially covering the housing and a clamping position completely covering the housing, said rigid sleeve being substantially the same length as the housing;

members in the rigid sleeve that project through the slots in the circumferential housing wall;

and an annulus mounted on said members in longitudinal alignment with the bladder, said annulus axially deforming the bladder as the rigid sleeve is slid to clamping position and releasing the bladder as said rigid sleeve is returned to inactive position, whereby fluid from the bladder inflates the annular chamber so the compliant sleeve grips a tool shank when the rigid sleeve is in clamping position, and said compliant sleeve releases the tool shank when the rigid sleeve is returned to inactive position.

14. The combination of claim 13 which includes resilient detent means engageable with an end portion of the rigid sleeve to releasably retain said rigid sleeve in clamping position.

15. The combination of claim 13 which includes a bladder confining tube on the inner periphery of the circumferential flange, and in which the bladder has a side against said tube and a side against the circumferential housing wall.

16. The combination of claim 13 in which the housing end walls are of vibration damping and heat insulating material.

17. The combination of claim 13 which includes resilient detent means engageable with an end portion of the rigid sleeve to releasably retain said rigid sleeve in clamping position, and a slidable release ring surrounding an end portion of the housing, said release ring being movable toward the rigid sleeve to depress said resilient detent means and release said rigid sleeve.

18. A vibration isolating and heat insulating hand grip for a power driven, manually manipulated impact tool which has a shank that mounts in a chuck, said grip comprising, in combination:

a vibration damping and heat insulating housing which has a rigid cylindrical sidewall and is open at both ends, the dimensions of said housing being such that it may be readily gripped by a human hand;

means within said housing including a compliant, non-porous sleeve which is open at both ends and which is large enough that a tool shank extends loosely therethrough, said sleeve forming the inner wall of an inflatable annular chamber;

and means operatively associated with said housing for inflating said chamber so the compliant sleeve firmly grips the tool shank, and for deflating the chamber to release said compliant sleeve from the tool shank.

19. The combination of claim 18 which includes annular end walls of vibration damping and heat insulating material on which the housing sidewall is mounted, and rigid annular means sealed to the inner periphery of said end walls and to the outer surface of the end portions of the compliant sleeve.

20. The combination of claim 19 in which the rigid annular means comprises a shell of non-porous material which forms an outer wall for the inflatable annular chamber.

21. The combination of claim 19 which includes manually manipulable means on the housing for inflating and deflating the chamber.

22. The combination of claim 21 in which the manually manipulable means includes a bladder which communicates with the chamber, and means for deforming the bladder to produce a flow of fluid between the bladder and the chamber.

23. The combination of claim 22 in which the bladder is mounted within the housing, the means for deforming the bladder is mounted within the housing for longitudinal movement, and manually movable means external to the housing is operatively connected to the bladder deforming means for moving it longitudinally.

24. The combination of claim 23 in which the bladder is U-shaped in cross section and has a bight portion confronting the bladder deforming means, and said deforming means deforms the bladder axially.

25. The combination of claim 24 in which both the bladder and the deforming means are annular and surround the compliant, non-porous sleeve.

* * * * *